United States Patent [19]

Fong et al.

[11] Patent Number: 5,004,786
[45] Date of Patent: * Apr. 2, 1991

[54] PROCESS FOR PRODUCING SULFOMETHYLAMIDE POLYMERS

[75] Inventors: Dodd W. Fong, Naperville; David J. Kowalski, LaGrange Park, both of Ill.

[73] Assignee: Nalco Chemical Company, Naperville, Ill.

[ * ] Notice: The portion of the term of this patent subsequent to Jun. 5, 2007 has been disclaimed.

[21] Appl. No.: 418,984

[22] Filed: Oct. 6, 1989

Related U.S. Application Data

[63] Continuation of Ser. No. 179,442, Apr. 8, 1988, abandoned, which is a continuation of Ser. No. 4,841, Jan. 12, 1987, Pat. No. 4,762,894.

[51] Int. Cl.$^5$ .................................................. C08F 8/34
[52] U.S. Cl. .................................. 525/344; 525/329.4
[58] Field of Search ................................ 525/344, 351

[56] References Cited

U.S. PATENT DOCUMENTS 4,016,086 4/1977 Norton .......................... 252/8.55 D
4,762,894 8/1988 Fong ................................... 525/344

FOREIGN PATENT DOCUMENTS 7206 10/1974 Czechoslovakia .
151073 9/1981 German Democratic Rep. .
25983 12/1963 Japan .
59664 8/1973 Japan .
28111 7/1974 Japan .
48154 12/1976 Japan .
74084 6/1977 Japan .
121091 10/1978 Japan .
16593 2/1979 Japan .
44019 4/1979 Japan .
16016 2/1980 Japan .

OTHER PUBLICATIONS

Author: B. Jansan, G. Ellinghorst; Title: "Radiation Initiated Grafting of Hydrophillic & Reactive . . ."; Radiation Physical Chemistry, vol. 18, No. 5-6, pp. 1195-1102, 1981.
Author: Kh. Verani, I. Mladenov and M. Pundeva; Title: "Amination of Polyacrylonitrile Hydrolysate by the Hoffman Reaction"; Yearbook of the Institute of Chemical Technology—Bougas, vol. 10, 1973.
Author: Savitskaya, M. N. & Kholodova, Yu. D.; Title: "Polyacrylamide And its Derivatives"; Inst. of Plant Physiology, Ukr. S.S.R. Academy of Sciences (Mar. 18, 1963).

Primary Examiner—Christopher Henderson
Attorney, Agent, or Firm—Donald G. Epple

[57] ABSTRACT

Polyacrylamide is reacted with formaldehyde and bisulfite at a temperature of at least about 100° C. and at an initial reaction mixture pH of less than about 12, preferably about 3 to about 8, to produce sulfomethylpolyacrylamide.

1 Claim, 1 Drawing Sheet

PROCESS FOR PRODUCING SULFOMETHYLAMIDE POLYMERS

This is a continuation of co-pending application Ser. No. 07/179,442 filed on Apr. 8, 1988 now abandoned, which is continuing application based on parent application Ser. No. 004,841, filed Jan. 12, 1987, now U.S. Pat. No. 4,762,894, which in turn was based on grandparent application Ser. No. 804,036, filed Dec. 3, 1985, now abandoned.

FIELD OF THE INVENTION

This invention relates broadly to the chemical arts, more particularly to the art of organic synthesis and specifically to the preparation of sulfomethylamide-containing polymers.

BACKGROUND OF THE INVENTION

In an article published in the December 1956 issue of *Industrial and Engineering Chemistry*, Vol. 48, No. 12, Pages 2132-7, A. M. Schiller and T. J. Suen reported on a technique of introducing sodium sulfomethyl groups into polyacrylamide through reaction with formaldehyde and sodium bisulfite. Schiller and Suen taught that the sulfomethylation reaction takes place at pH levels of higher than 10 and temperatures on the order of 50°-75° C. This teaching has remained uncontroverted in the literature during the years intervening to the present.

Unexpectedly, as applicants have learned from co-worker Dennis P. Bakalik who used Carbon-13 Nuclear Magnetic Resonance technology, no sulfomethylation of polyacrylamide occurs under the reaction conditions of high pH and comparatively low temperature which were specified by Schiller and Suen. Instead, polyacrylamide undergoes hydrolysis in the reaction milieu; and complex equilibria species form among formaldehyde, bisulfite and the ammonia that is generated.

Accordingly, an important object of the present invention is to provide sulfomethylpolyacrylamide and a method of synthesizing the same using formaldehyde and bisulfite.

Another board object of the invention is to provide a simple, effective and inexpensive chemical route to sulfomethylacrylamide polymers and the like.

These and other objects and featues of the present invention will become apparent from the following descriptions.

BRIEF DESCRIPTION OF THE INVENTION

According to the present invention, sulfomethylamide-containing polymers are prepared from acrylamide-containing polymers with sodium formaldehyde bisulfite (or formaldehyde and sodium bisulfite) in from about ¼ to about 8 hours at temperatures of at least about 100° C. and at a pH of less than 12, preferably at temperature higher than 110° C. and at a pH of 3 to 8. Under these reaction conditions, sulfomethylamide readily forms in high conversion, based on the sodium formaldehyde bisulfite charged. The products, characterized by C-13 NMR spectroscopy, Infra-Red spectroscopy, and colloid titration, contain at least three functional groups: namely, carboxylate, primary amide and sulfomethylamide. Applicants have found that the elapsed time for completing the sulfomethylation is a product of such reaction kinetics as pH and temperature and not an independent variable.

DETAILED DESCRIPTION OF THE INVENTION

Figure 1:
FIG. 1 is Carbon-13 Nuclear Magnetic Resonance spectrum of a solution of polyacrylamide and sodium formaldehyde bisulfite, at a pH of 12, after mixing.

The reaction of polyacrylamide with formaldehyde and bisulfite to produce the sulfomethylated amide is of considerable interest because of the many industrial applications that have been proposed for inexpensive polymeric sulfonates, such as water treatment agents, drilling field dispersants and flocculents. A variety of reactions have been postulated as taking place in the aforementioned chemical system, but no persuasive evidence has been adduced heretofore to support the proposition that sulfomethylation of the amide occurs under the conditions generally thought to produce this adduct. On the contrary, we have learned that the major products formed at a pH of 12 and at temperatures on the order of 75° C. are partially hydrolyzed polyacrylamide and the mono-, bis-, and tris-sulfomethylamine.

Advantageously, we have first obtained polyacrylamide from the polymerization of acrylamide in an aqueous solution using redox initiators. Polymerizations conducted in a 28% solution produced polymer having an average molecular weight of 6000 as determined by GPC. The source of formaldehyde and bisulfite for the subsequent sulfomethylation reaction was selected to be 1:1 sodium formaldehyde bisulfite (hydroxymethanesulfonic acid, sodium salt) purchased from a commerical source. This latter material exhibited a sharp C-13 line at pH 6 and was employed without further purification.

Reaction conditions and results are set forth in the working examples described hereinbelow; and Carbon-13 NMR spectra were obtained using a JEOL FX90Q operating at 22.5 MHz for carbon. Since no attempt was made to quantify either reactants or products, spectra were obtained using 45° pulses, noise decoupling, and recycle times of 3 seconds. At the end of accumulation, an insert containing hexamethyl disiloxane was introduced into the sample tube. The resulting peak was used to reference chemical shifts to TMS (all references herein to chemical shifts use the delta scale). Spectra were taken at 30° C. and represent the addition of 3000 transients. Since spectral accumulation requires about 2.5 hours, the spectrum obtained "after mixing" represented a composite species evolving during this period.

In order to describe the invention more fully, the following specific examples are given without, however, limiting the invention to the precise details and conditions described except as required in the appended claims.

EXAMPLE 1

A solution of poly(acrylamide [75 m %]-acrylic acid) (150 g, 27.5% in water) and sodium formaldehyde bisulfite (15.5 g), pH 4.3, was heated to 150° C. and maintained at that temperature for four hours in a 300 ml. Parr reactor which was equipped with a mechanical stirrer and a thermocouple. The resultant product was cooled to room temperature. The pH of the resulting polymer solution was 5.9. Results of C-13 NMR analysis showed that the polymer contained about 20% sulfomethylamide and about 30% carboxylate.

EXAMPLE 2

A solution of poly(acrylamide [75 m %]-acrylic acid) (150 g, 27.5% in water) and sodium formaldehyde bisulfite 15.5% g), pH 4.3, was heated to and maintained at 120° C. for four hours in a 300 ml. Parr reactor which was equipped with a mechanical stirrer and a thermocouple. The resultant product was cooled to room temperature. The pH of the resulting polymer solution was 5.6. Results of C-13 NMR analysis showed that the polymer contained about 15% sulfomethylamide and about 40% carboxylate.

EXAMPLE 3

(a) A solution of polyacrylamides (100 g, 28.5%) and sodium formaldehyde bisulfite (16.1 g), pH adjusted to 13 with 50% NaOH, was heated to 50° C. for three hours. Results of C-13 NMR analysis of the product showed no sulfomethylamide formation.

(b) The reaction mixture was again heated, to 90° C. for three hours. Results of C-13 NMR analysis of the product showed no sulfomethylamide formation.

(c) The reaction mixture was then heated in a Parr reactor to 150° C. for four hours. The pH of the final polymer solution was 9.8. Results of C-13 NMR analysis of the product showed that the resulting polymer contained about 10% sulfomethylamide.

From the foregoing examples, it will be apparent that sulfomethylpolyacrylamide was produced at temperature of at least about 100° C. and at pH levels of less than about 12.

Figure 2:
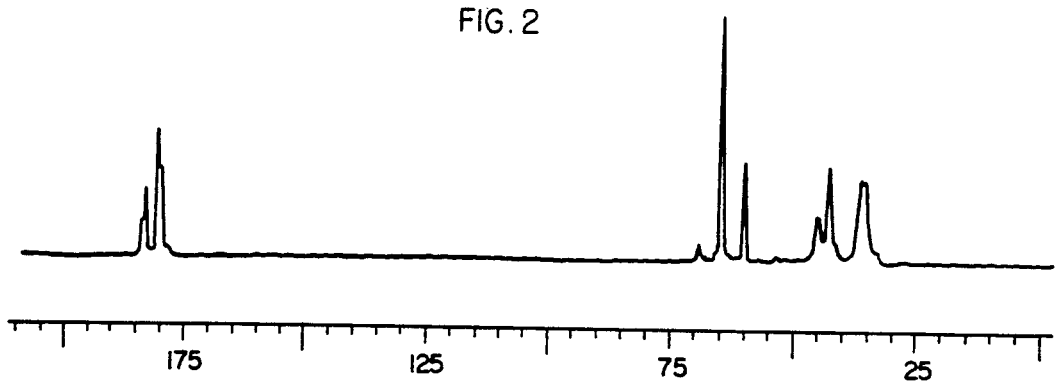
FIG. 2 is a similar spectrum after the solution was heated for 4 hours at 75° C.

In order to enhance the understanding of the invention, reference will now be made to the drawing. There, FIGS. 1 and 2 are Carbon-13 NMR spectra established by the aforementioned Dennis P. Bakalik for a solution of polyacrylamide and sodium formaldehyde bisulfite (1:0.5), at a pH of 12. The spectrum of FIG. 1 demonstrates that some reaction takes place rather quickly at ambient temperatures and high pH.

The species principally responsible for the spectrum of FIG. 1 can be assigned and indicate the formation of a terpolymer of acrylamide, methylol acrylamide, and acrylate salt in addition to some low molecular weight species derived from formaldehyde, bisulfite and ammonia. The peak at 180.3 is due to the carbonyl of acrylamide in the terpolymer, while the bread peaks at 35.8 and 42.9 represent backbone carbons. The peaks at 177.9 and 64.4 are indicative of the carbonyl and methylene of methylol acrylamide units. The peak at 183.7 results from the acrylate carbonyl produced via hydrolysis.

Other major peaks present in the spectrum of FIG. 1 include those at 79.1, 78.1, 68.2 and 65.2. The board peak at 78.1 can be assigned to unreacted hydroxymethanesulfonate, through spiking experiments, while the peak at 65.2 represents the reaction product of ammonia with two moles of hydroxymethanesulfonate. The species responsible for the peak at 68.2 is a reaction product of ammonia with formaldehyde since this species can be generated through stepwise addition of ammonium hydroxide to an aqueous solution of paraformaldehyde at pH=12 The exact nature of this formaldehyde-ammonia adduct is unknown. The peak at 79.1 results from molecular species derived from ammonia, formaldehyde and bisulfite, other than the 1:1, 1:2, and 1:3 complexes. It is sufficient to note that, upon heating, neither of the unassigned species, 68.2 nor 79.1, survive and both are converted into the following reaction products:

(1) $H_2NCH_2SO_3Na$
(2) $HN(CH_2SO_3Na)_2$
(3) $N(CH_2SO_3Na)_3$

The spectrum of FIG. 2 was obtained after heating the reaction mixtures for 4 hours at 75° C. These are conditions that have been taught in the prior art as producing sulfomethylated polyacrylamide. The two major groupings of peaks in the carbonyl region at 180.5, 181.0 and 183.9, 184.4 are from arcylamide and acrylate carbonyls respectively. These pairs of peaks represent the major sequence triads generated on basic hydrolysis of polyacrylamide. The broad peaks at 35.8, 42.9, and 45.5 are due to backbone carbons of the copolymer.

The peaks at 60.4, 65.3 and 69.7 are assigned respectively to the mono-, di- and tri-substituted amines resulting from reaction of ammonia with hydroxymethanesulfonate. These assignments were made by examining the interconversion of species in the reaction of ammonia with sodium formaldehyde bisulfite under a variety of stoichiometric conditions.

Figure 3:
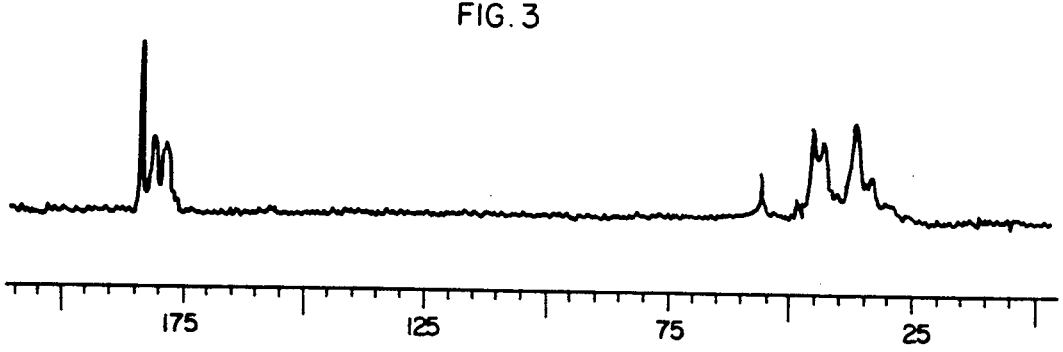
FIG. 3 is the Carbon-13 NMR spectrum for sulfomethylamide copolymer according to the present invention.

Significantly, the spectrum of FIG. 3, representing a reaction product according to the present invention, exhibits an absence of peaks at 60.4, 65.3 and 69.7, representing the substituted amines. Furthermore, the spectrum of FIG. 3 is characterized by the occurrance of signals at 56.5 and 178. The 178 signal is consistent with the presence of a secondary amide. The 56.5 signal was determined to be a methylene from an off-resonance experiment. The broadness of this signal suggests it is a part of the polymer. The signal is assigned to the methylene between the nitrogen of the amide and the sulfur of the sulfonate.

The presence of sulfonate is further confirmed by absorption bands at 1200 and 1050 $cm^{-1}$ IR spectra of sulfomethylamide copolymer prepared according to the present invention at a pH of 5.5, and when acidified to a pH of 1. The presence of secondary amide is confirmed by an absorption band at 1550 $cm^{-1}$ after the sample was acidified to pH 1 to remove carboxylate salt interference.

The amount of sulfomethylamide group incorporated into the copolymers can be determined by photometric colloid titration at two pH's. The principle of this method is based on the fact that formaldehyde bisulfite will not be detected by this method. At a pH of 2-3, the carboxylic acid functionality will be negligibly ionized so that only the strong sulfonate group incorporated in the backbone will be determined by titration. At a pH of 10, since the carboxylic acid is completely ionized, both it and the sulfonate group will be titrated. The amount of sulfomethylamide incorporation determined by this method is in good agreement with that determined by the C-13 NMR method.

The term "sulfomethylpolyacrylamide" is used herein to encompass the sulfomethylated homopolymers of acrylamide or their homologs and the sulfomethylated copolymers, including terpolymers, of acrylamide or their homologs, with acrylic acid or its homologs, the essential characteristic of the polyacrylamide moiety being the presence of a primary amide group.

The specific examples herein set forth are to be considered as being primarily illustrative. Various modifications and extensions of the principles of the invention will, no doubt, occur to those skilled in the art; and such changes are to be understood as forming a part of our invention insofar as they fall within the spirit and scope of the appended claims.

The invention is claimed as follows:

1. A method of reacting polyacrylamide with formaldehyde and bisulfite to produce a terpolymer containing sulfomethyl acrylamide/acrylamide/acrylate, wherein the initial pH of the reaction mixture is less than about 12, and wherein the polyacrylamide, formaldehyde, and bisulfite reactants are heated together and agitated, and the reaction temperature is maintained at from 110° C. to about 250° C.

* * * * *